United States Patent [19]

Hales et al.

[11] Patent Number: 5,153,293
[45] Date of Patent: Oct. 6, 1992

[54] PROCESS FOR THE PREPARATION OF ORGANOPOLYSILOXANE COPOLYMERS

[75] Inventors: Michael G. Hales, Isabella County; William N. Fenton, Freeland, both of Mich.

[73] Assignee: Dow Corning Corporation, Midland, Mich.

[21] Appl. No.: 670,556

[22] Filed: Mar. 18, 1991

[51] Int. Cl.$^5$ ............................................. C08G 77/06
[52] U.S. Cl. ........................................ 528/15; 528/25; 524/773; 524/777; 556/467; 556/457; 556/479
[58] Field of Search .................. 524/773, 777; 528/15, 528/25; 556/479, 467, 457

[56] References Cited

U.S. PATENT DOCUMENTS

| | | | |
|---|---|---|---|
| 3,280,160 | 10/1966 | Bailey | 260/448.2 |
| 3,401,192 | 9/1968 | Kollonitsch | 260/471 |
| 3,518,288 | 6/1970 | Haluska | 260/448.2 |
| 3,980,688 | 9/1976 | Litteral et al. | 260/448.8 |
| 4,122,029 | 10/1978 | Gee et al. | 252/309 |
| 4,857,583 | 8/1989 | Austin et al. | 524/761 |
| 4,877,854 | 10/1989 | Hattori et al. | 556/479 |

*Primary Examiner*—Melvyn I. Marquis
*Attorney, Agent, or Firm*—John D. Thallemer; Robert L. McKellar

[57] ABSTRACT

An improved process is provided for the preparation of siloxane-oxyalkylene block copolymer surfactant compositions which utilize a hydrosilylation reaction with a monocarboxylate ester of an alkanediol as the reaction solvent. The reaction solvent need not be removed from the block copolymer, particularly when the block copolymer is used as a surfactant for polyurethane foam formulations. 2,2,4-trimethyl-1,3-pentanediol monoisobutyrate is the preferred reaction solvent.

11 Claims, No Drawings

PROCESS FOR THE PREPARATION OF ORGANOPOLYSILOXANE COPOLYMERS

BACKGROUND OF THE INVENTION

This invention relates to a process for the preparation of siloxane-oxyalkylene copolymers by the hydrosilylation reaction of an organohydrogensiloxane and an olefinically substituted polyoxyalkylene in a monocarboxylate ester of an alkanediol solvent In one aspect, this invention is directed to a process for the preparation of improved siloxane-oxyalkylene copolymer compositions. In a further aspect, the invention is directed to siloxane-oxyalkylene copolymers that are suitable for use as surfactants in urethane foam applications.

The hydrosilylation reaction between the organohydrogenopolysiloxane and an olefinically substituted polyoxyalkylene reactant is typically performed in a low molecular weight volatile hydrocarbon solvent such as benzene, toluene, xylene or isopropanol so as to promote the solubility of the reactants, to aid in handling the reactants or to moderate an exothermic reaction. Less typically, the hydrosilylation reaction may be conducted without a solvent such as disclosed in U.S. Pat. No. 3,980,688 or conducted in an oxygen containing solvent such as an ether, a polyether, or a lower or higher molecular weight alcohol.

For example, U.S. Pat. Nos. 3,280,160 and 3,401,192 disclose the preparation of copolymers in n-butylether and in a 50/50 mixture of isopropyl alcohol/toluene, respectively. In U.S. Pat. No. 4,122,029 the use of isopropyl alcohol is disclosed and in U.S. Pat. No. 3,518,288 the patentee teaches the use of n-propanol/toluene as a suitable solvent for the preparation of siloxane-oxyalkylene copolymers. The particular solvents employed in U.S. Pat. No. 4,857,583 are saturated polyols containing two or more hydroxyl groups U.S. Pat. No. 4,857,583 states that if one were to use copolymers containing monohydric higher alcohols in urethane foam applications, these alcohols will enter into the urethane reaction and act as reaction chain terminators in a detrimental fashion because they contain only one hydroxyl group.

Of the above mentioned solvents, isopropyl alcohol (IPA) is the most common solvent used. IPA is known to compatibilize the siloxane and the glycol(s) so that the reaction proceeds more readily. However, disadvantages to using IPA exist. Such disadvantages include: (1) IPA competes with the vinylated glycol for SiH sites on the siloxane backbone resulting in the formation of isopropoxy which acts as a defoamer and contributes to surfactant instability; (2) IPA reacts with isocyanate effectively lowering the index of the formulation, therefore, the IPA must be stripped from the product and recovered, a process which is both time consuming and expensive; (3) IPA is miscible with water which is harmful in the manufacture of polyurethane foam surfactants; and (4) IPA is flammable which creates additional manufacturing problems. In addition, surfactants manufactured utilizing IPA cannot be restripped without destroying the performance of the surfactant.

In contrast to the teachings of the prior art, the present invention utilizes a monocarboxylate ester of an alkanediol solvent which contains only one hydroxy group. Such a solvent, however, does not have the disadvantages associated with it as are present when using IPA. The present inventors have discovered that such monocarboxylate ester solvents react only minimally with SiH on the siloxane backbone. The monocarboxylate ester solvents also do not need to be stripped from the product and recovered. In addition, the monocarboxylate ester solvents are not hygroscopic and therefore the problems associated with water contamination are alleviated. Furthermore, the monocarboxylate ester solvents are not flammable.

It is therefore an object of the present invention to provide an improved process for the preparation of siloxane-oxyalkylene copolymers. Another object of this invention is to provide a process for the preparation of siloxane-oxyalkylene copolymers which are useful in the formulation of urethane foams and which contain a monocarboxylate ester of an alkanediol solvent. These and other objects will readily become apparent to those skilled in the art in the light of the teachings contained herein.

SUMMARY OF THE INVENTION

These copolymers are prepared by the hydrosilylation reaction between an organohydrogenpolysiloxane and an olefinically substituted polyoxyalkylene, in the presence of a monocarboxylate ester of an alkanediol.

The process of the present invention comprises the steps of:

(I) forming a mixture of:

(A) an organosiloxane selected from the group consisting of organohydrogensiloxanes having the average structural formula:

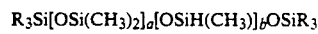
$$R_3Si[OSi(CH_3)_2]_a[OSiH(CH_3)]_bOSiR_3$$

in which formula

R is a hydrocarbon radical free of aliphatic unsaturation and contains from 1 to 10 carbon atoms, a has an average value from 1 to 192, and b has an average value from 1 to 30;

(B) a polyoxyalkylene selected from the group consisting of:

$$R^1(OCH_2CH_2)_z\text{—}OR^2 \qquad (i)$$

$$R^1(OCH_2\overset{\underset{\displaystyle |}{CH_3}}{C}H)_w\text{—}OR^2 \qquad (ii)$$

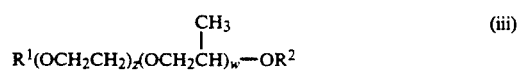
$$R^1(OCH_2CH_2)_z(OCH_2\overset{\underset{\displaystyle |}{CH_3}}{C}H)_w\text{—}OR^2 \qquad (iii)$$

wherein the $(OCH_2CH_2)$ units and the

$$\overset{\underset{\displaystyle |}{CH_3}}{(OCH_2C}H)$$

units may be blocked or random, $R^1$ is an alkenyl group, $R^2$ is any substituent which does not interfere with the process, z has a value of from 1 to 20; and w has a value of 1 to 20;

(C) a monocarboxylate ester of an alkanediol; and (II) maintaining the mixture in an inert atmosphere to a temperature which does not exceed the temperature at which the organohydrogensiloxane reacts with the monocarboxylate ester of an alkanediol;

(III) adding to said heated mixture, a catalytic amount of a noble metal hydrosilylation catalyst, (IV) maintaining the temperature of said mixture below 130° C.; and (V) recovering said copolymer.

DETAILED DESCRIPTION OF THE INVENTION

As indicated above, the present invention provides a process for the preparation of organosiloxane copolymers which are particularly useful in the preparation of rigid, high resiliency flexible and conventional flexible polyurethane foams. The process involves the hydrosilylation reaction of an organohydrogenpolysiloxane and an olefinically substituted polyoxyalkylene in the presence of a monocarboxylate ester of an alkanediol.

The organohydrogensiloxane compounds employed in the present invention for the preparation of the copolymers are those having the average structural formula:

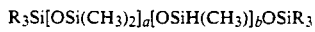

in which formula

R is a hydrocarbon radical free of aliphatic unsaturation and contains from 1 to 10 carbon atoms, a has an average value from 1 to 192, and b has an average value from 1 to 30;

These organohydrogen siloxanes can be readily prepared by well known reactions and are commercially available.

The R group in the organohydrogensiloxane formula can be any hydrocarbon radical free of aliphatic unsaturation which contains from 1 to 10 carbon atoms. For example, R can be an alkyl, cycloalkyl, aryl, alkaryl, or an aralkyl radical. More specifically, R can be a methyl, ethyl, propyl, isopropyl, butyl, tertiary butyl, amyl, hexyl, heptyl, octyl, nonyl, decyl, cyclopentyl, cyclohexyl, phenyl, naphthyl, tolyl, xylyl, mesityl, t-butylphenyl, benzyl, 2-phenylethyl or a 2-phenylpropyl radical.

The olefinically substituted polyoxyalkylene reactant which can be employed in the process of this invention is selected from:

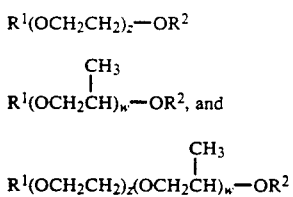

wherein $R^1$ denotes an alkylene group containing from 3 to 18 carbon atoms; $R^2$ is any substituent which does not interfere with the hydrosilylation reaction, z has a value of 1 to 20 and w has a value of 1 to 20. The ethylene oxide and propylene oxide units may be blocked or randomly distributed.

In the above polyoxyalkylene formula, $R^1$ is any monovalent alkylene radical. For example, $R^1$ can be ethylene, propylene, butylene, isobutylene, hexylene, octylene, dodecylene, octadecylene or a triacontylene radical. Preferably, $R^1$ contains from 3 to 18 carbon atoms. Examples of $OR^2$ include hydroxy, alkoxy, acyloxy, aryloxy, alkylsilyl, acetyloxy, carbonate ester and isocyanate. Preferably, $R^2$ does not contain either an amine or mercaptan group.

In contrast to the prior art processes, the present invention utilizes a monocarboxylate ester of an alkanediol which contains one hydroxyl group as the solvent in which the hydrosilylation reaction is conducted and which need not be removed from the reaction mixture, particularly when the copolymer reaction product is subsequently used in the preparation of urethane foams. Such monocarboxylate ester solvents which contain one hydroxy group are essentially nontoxic. These solvents react only minimally with SiH on the siloxane backbone. In addition, these solvents are not hygroscopic and therefore the problems associated with water contamination are alleviated. Furthermore, the monocarboxylate ester solvents are not flammable. An example of a preferred monocarboxylate ester is 2,2,4-trimethyl-1,3-pentanediol monoisobutyrate, available as TEXANOL(R), from Eastman Chemical Products, Inc.

As previously indicated, the hydrosilylation reaction is conducted in the presence of a noble metal hydrosilylation catalyst. Thus, the hydrosilylation reaction between the organohydrogenpolysiloxane and the olefinically substituted polyoxyalkylene reactant is facilitated by using a catalytic amount of a noble metal containing catalyst. Such catalysts are well known and include platinum, palladium and rhodium-containing catalysts. The catalyst is employed in a catalytic amount sufficient to promote the hydrosilylation reaction. In practice the amount of catalyst will usually be within the range of from 1 to 30 ppm of noble metal based on the total parts of the mixture of reactants and solvent. Chloroplatinic acid ($H_2PtCl_6.H_2O$) is particularly preferred.

The hydrosilylation reaction, as previously noted, can be optionally conducted in the presence of a carboxylic acid salt. The preferred carboxylic acid salts contain 2 or more carbon atoms and are composed of carbon, hydrogen and oxygen. Particularly preferred are the monocarboxylic acid salts containing from 2 to 20 carbon atoms. Concentrations up to about 10,000 ppm can be employed and the actual amount will be dependent to some degree on the particular carboxylic acid salt employed.

By conducting the hydrosilylation reaction in the manner indicated above, and employing a monocarboxylate ester of an alkanediol which contains one hydroxyl group and a carboxylic acid salt, improvements are obtained in one or more aspects of the reaction, such as reaction rate, reaction yield, reaction selectivity, reaction processes or reaction product processing in urethane foam applications. For example, when 2,2,4-trimethyl-1,3-pentanediol monoisobutyrate is used, it has been found that the use of at least 6 percent by weight, based on the weight of the reactants, of the 2,2,4-trimethyl-1,3-pentanediol monoisobutyrate and 0.05 percent of a carboxylic acid salt such as sodium acetate will aid in the handling of the reactants. Of course, amounts of the monocarboxylate ester of an alkanediol larger than 6 percent can be used and greater than 0.05 percent of the sodium acetate can be used if desired. In general, from 5 to about 50 weight percent and more preferably from about 6 to about 37 weight percent of the monocarboxylate ester of an alkanediol have been found to give good results.

The organopolysiloxane surfactants prepared by the process of the present invention are particularly useful and have been found to be excellent and efficient surfactants for the preparation of rigid, high resiliency flexible, and conventional flexible polyurethane foams. It has been found that the surfactants of this invention provide improved levels of performance to polyurethane foams and avoid the necessity of solvent removal from the reaction mixture in which the organopolysiloxane was prepared. Since a relatively non-toxic solvent is used and its removal from the reaction mixture avoided, the surfactants are prepared under desirable environmental conditions.

In producing the polyurethane foams using the surfactants of this invention, one or more polyether polyols is employed for the reaction with the polyisocyanate reactant to provide the urethane linkage. Such polyether polyols have an average of at least two, and typically 2.0 to 3.5, hydroxyl groups per molecule and include compounds which consist of carbon, hydrogen and oxygen and compounds that may also contain phosphorous, halogen, and or nitrogen. Such polyether polyols are well known in the art and are commercially available.

The organic polyisocyanates that are useful in producing polyether polyurethane foams in accordance with the process of this invention are also well known in the art and are organic compounds that contain at least two isocyanate groups and any such compounds or mixtures thereof can be employed. The toluene diisocyanates are among many suitable isocyanates which are commercially used in the preparation of foams.

The urethane-foaming reaction is usually effected in the presence of a minor amount of a catalyst, preferably an amine catalyst and usually a tertiary amine. It is also preferred to include a minor amount of certain metal catalysts in addition to the amine catalyst in the component of the reaction mixture. Such supplementary catalysts are well known to those skilled in the art of polyether-based polyurethane foam manufacture. For example, useful metal catalysts include organic derivatives of tin, particularly tin compounds of carboxylic acids such as stannous octoate, stannous oleate and the like.

Foaming is accomplished by employing a small amount of a polyurethane blowing agent such as water in the reaction mixture, which upon reaction with isocyanate generates carbon dioxide in situ, or through the use of blowing agents which are vaporized by the exotherm of the reaction or by a combination of the two. These methods are well known in the art.

The polyether-based polyurethane foams of this invention may be formed in accordance with any of the processing techniques known in the art such as, in particular the "one-shot" technique, also known as the "one-step" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the blowing agents, polyether, polyol and catalyst components.

It is understood that the relative amounts of the various components of the foam formulation are not narrowly critical. The polyether polyol and polyisocyanate are present in the foam-producing formulation in a major amount. The relative amounts of these two components in the amount required to produce the desired urethane structure of the foam and such relative amounts are well known in the art. The blowing agent, catalyst and surfactant are each present in a minor amount necessary to achieve the function of the component. Thus, the blowing agent is present in an amount sufficient to foam the reaction mixture, the catalyst is present in a catalytic amount which is the amount necessary to catalyze the reaction to produce the urethane at a reasonable rate, and the surfactant is present in an amount sufficient to impart the desired properties as indicated in Tables I-V.

The polyurethanes produced in accordance with the present invention can be used in the same areas as conventional flexible, high resiliency flexible and rigid polyether polyurethanes. For example, the foams of the present invention can be used with advantage in the manufacture of textile interliners, furniture, mattresses, laminates, linings, building insulation, flooring leveling, cushions, mattresses, padding, carpet underlay, packaging, gaskets, sealers, thermal insulators, upholstery, absorbent of crude oil spills on seawater, packaging and packing, marine flotation, auto components, cigarette filters, boat hulls, soundproofing, salvaging operations, ship-building (for buoyancy), transportation insulation for box cars, refrigerated cars, tank and hopper cars, trucks and trailers, insulation for storage tanks, ships' holds, pipelines, and the like.

The apparatus and testing procedures used for the results shown herein are as follows:

FOAMING EFFICIENCY TEST FOR CONVENTIONAL FLEXIBLE FOAM

| Ingredients | Formula Parts by weight |
|---|---|
| 1. Premix | |
| a. CP-3512 | 100.0 |
| (available from Dow Chemical Company, Midland, MI.) | |
| b. Methylene Chloride | 3.25 |
| (Urethane Grade from any suitable source) | |
| c. Distilled Water | 4.50 |
| d. Dabco ® BL-11 | 0.09 |
| (available from Air Products & Chemicals Inc., Allentown, PA.) | |
| 2. Surfactant | as specified |
| 3. Stannous Octoate/Dioctyl Phthalate-50/50 | 0.4 |
| (Dabco ® T-10, available from Air Products & Chemicals Inc., Allentown, PA.) | |
| 4. Toluene Diisocyanate-105 Index | 43.5 mL |
| (Hylene ®, 80/20 TDI, E.I. DuPont, Elastomer Chemicals Division, Akron, OH.) | |

Mixing Instructions

1. Premix—Weigh c and d into a clean container and mix well. Add a and mix. Add b and mix.

2. Foam—Weigh 107.8 g of premix, 2 and 3 into a 1 quart Dixie cup. Mix at 1250±10 rpm for 15±1 second. Add the toluene diisocyanate volumetrically. Mix at 1750±10 rpm for 6±0.5 seconds.

Procedure For Determining Breathability

1. Abstract

The breathability, defined as air flow through a piece of foam, was measured and the results were reported in cubic feet per minute.

2. Apparatus

Air flow apparatus: AMSCOR Model 1377 Urethane Foam Porosity Instrument, AMSCOR Inc., Freeport, Tex.

Balance: Mettler toploading±0.01 g accuracy, available from Mettler Instrument Corp., Hightstown, N.J.

Cup: 1 quart Dixie cup.

Mixer: Includes the following parts.
    a. Drill press stand: Sears Roebuck and Co., Model 355.2529b.
    b. Mixer: Black and Decker heavy duty No. 1041 Holgun Drill.
    c. Mixer blade: 1¼ in. (3.2 cm.) stainless steel shaft 6⅛ in. (15.6 cm.) long with 8 blades 1/8×1/8 in. (0.3×0.3 cm.) bar stock silver soldered on to the shaft at a right angle to each other. One set of 4 blades flush with the bottom of the shaft, the other ⅜ in. (0.95 cm.) up the shaft. The total blade diameter is 3⅛ in. (7.9 cm.).
    d. Tachometer: 0 to 3000 rpm, Servo-Tek Products, Hawthorne, N.J., Model St-9540-5.
    e. Tachometer generator: Servo-Tek Products, Model SB-7408-2.
    f. Variac: General Radio Co., Chicago, Ill., Model W5MT3.

Pail: 3 quart (2.9 liter), available from Lilly Tulip Cup Co., paint insert, unwaxed, type 1OT1.

3. Procedure

The ingredients as specified in the formulation were placed into the cup and weighed. Immediately, the sample was mixed at the specified conditions. The required amount of toluene diisocyanate was added as quickly as possible through a pipet. The sample was mixed at the specified conditions. The sample, 149 grams, was transferred from the cup to the pail. The pail was placed in a hood at 23° C. and 50% relative humidity (RH) and the sample was allowed to foam to completion. The pail was then placed in the oven which was set at 93° C., for 10 minutes. A 2×2×1 inch block was cut from the center of the foam and placed in the specimen holder of the urethane foam porosity instrument. The instrument was turned on and the power vacuum control was set to 60. The high range valve was adjusted to give a reading of approximately 0.5 in. (1.27 cm.) of water on the draft gage. The fine tune valve was adjusted to give a reading of 0.5 in. (1.27 cm.) of water on the draft gage. The value on the air flow gage in cubic feet per minute was reported as breathability.

Procedure For Determining Density

1. Abstract

The density of regularly-shaped solid materials is determined by weighing and measuring a piece of the material.

2. Procedure

A 2×2×1 inch sample was cut out of the foam. The sample was weighed to the nearest one part per thousand. The density was calculated in g/cm³ using the formula:

$$\text{Density (g/cm}^3\text{)} = \frac{\text{weight (grams)}}{L \times W \times H}$$

L = length in cm.
W = width in cm.
H = height in cm.

FOAMING EFFICIENCY TEST FOR RIGID FOAM

Formula

| Ingredients | Parts by weight |
|---|---|
| 1. Premix | |
| a. Pluracol ® 364 | 90.0 |
| (available from BASF Wyandotte, Wyandotte, MI.) | |
| b. Fyrol ® 6 | 10.0 |
| (available from Stauffer Chemical Co., Westport, CN.) | |
| c. Distilled Water | 0.5 |
| d. Dabco ® Polycat 8 | 0.5 |
| (available from Air Products Chemicals Inc., Allentown, PA.) | |
| e. Freon 11B | 40.0 |
| (available from E.I. DuPont, Wilminton, DE.) | |
| 2. Surfactant | as specified |
| 3. Mondur ® MR (MDI) | 132 pts/141 pts premix |
| (available from Mobay Chemical Co., Pittsburgh. PA.) | |

Mixing Instructions

1. Premix
    a. Weigh a, b, c, d and e into a clean container and roll on can roller for 20 minutes.
    b. Let stand until air bubbles have disappeared-about ½ hour.
    c. Premix should be stored in an air tight container at all times.

2. Foam (Molded Slab)
    a. Weigh into a 1 quart Dixie cup:
    Premix 140.5±0.1 g
    Surfactant as specified
    Mondur(®) MR 132.0±0.1 g
    b. Mix at 1200±10 rpm for 10±0.5 seconds
    c. Rapidly pour into the specified mold.
    d. Wait 15 minutes before removing foam from mold.

3. Foam, Cup
    a. Weigh into a 1 quart Dixie cup:
    Premix 50.0±0.1 g
    Surfactant as specified
    Mondur(®) MR 46.5±0.1 g
    b. Mix at 1200±10 rpm for 10±0.5 seconds

Procedure For Determining Thermal Conductivity-K-Factor

1. Abstract

The thermal conductivity of the material was measured using an Anacon Thermal Conductivity Analyzer. The result was reported as the K-factor, which is defined as:

$$K = \frac{(\text{BTU in.})}{(\text{hr.})(\text{ft}^3)(°\text{F.})}$$

2. Apparatus

Instrument: Model 88 K-factor Thermal Conductivity Instrument, Anacon Inc., Ashland, Mass.
Mold: ¾ in.×4½ in.×4½ in. (1.9 cm.×11.4 cm.×11.4 cm.). Available from any suitable source.

3. Procedure

A cured slab was prepared as specified. The slab was conditioned for one hour at 70°±2° C. and 50±5% RH. The K-factor instrument was allowed to warm up for 30 minutes. The sample was placed in the opening and the pressure plate was lowered. The stabilized reading was reported as the K-factor.

Procedure For Determining Density

1 Abstract

The density of regularly-shaped solid materials is determined by weighing and measuring a piece of the material.

2. Procedure

A $7 \times 7 \times 1.5$ in. sample was cut out of the foam. The sample was weighed to the nearest one part per thousand. The density was calculated in lbs/ft$^3$ using the formula:

$$\text{Density (lbs/ft}^3\text{)} = \frac{\text{weight (grams)}}{L \times W \times H}$$

L = length in ft.
W = width in ft.
H = height in ft.

Procedure For Determining Foam Height

The foam ingredients were mixed in the cup as specified in the formulation. Immediately, the cup was fitted into the horizontal portion of an L-shaped panel so that the rim of the cup rested on the bottom of the panel. The material was allowed to foam at $23° \pm 2°$ C. and $50 \pm 4\%$ RH until the foam stopped rising. The sample was left alone for 10 minutes. The sample was removed from the mold and measured. The foam height of the vertical leg was measured to the nearest tenth of a millimeter.

FOAMING EFFICIENCY TEST FOR HIGH RESILIENCY FLEXIBLE FOAM

Formula

| Ingredients | Parts by weight |
| --- | --- |
| 1. Premix | |
| a. VORANOL ® CP4701 | 40.00 |
| (available from Dow Chemical Co., Midland, MI.) | |
| b. NIAX ® 34-28 | 60.00 |
| (available from Union Carbide Corp., New York, NY.) | |
| c. Distilled Water | 3.50 |
| d. Freon 11B | 2.00 |
| (available from E.I. DuPont, Wilmington, DE.) | |
| e. NIAX ® A-107 | 0.10 |
| (available from Union Carbide Corp., New York, NY.) | |
| f. Diethanol Amine | 1.00 |
| (available from Dow Chemical Co., Midland, MI.) | |
| g. DABCO ® 33LV | 0.55 |
| (available from Air Products, Allentown, PA.) | |
| 2. Surfactant | as specified |
| 3. Catalyst Premix | |
| a. DABCO ® T-12 | 10.0 |
| (available from Air Products, Allentown, PA.) | |
| b. VORANOL ® CP4701 | 90.0 |
| (available from Dow Chemical Co., Midland, MI.) | |
| 4. Toluene Diisocyanate, TD-80 | |
| (available from Mobay Chemical Co., Pittsburgh, PA.) | |

Mixing Instructions

1. Premix
   a. Weigh 1a, 1b, 1c, 1d and 1e into a clean container.
   b. Roll on can roller for 30 minutes. Let stand 5 minutes. Roll for another 30 minutes.
   c. Let stand at least 4 hours to de-air and stabilize to temperature ($20° \pm 1°$ C.) before use.
   d. Premix should be stored in an air tight container at all times to prevent loss of Freon 11B.
2. Catalyst Premix
   a. Weigh 3a and 3b into a clean container.
   b. Tumble 20 minutes to mix well.
3. Foam
   a. Weigh into a 1 quart Dixie cup:
      Premix (1) $150.0 \pm 0.05$ g
      Surfactant as specified
      Catalyst Premix (3) $0.40 \pm 0.01$ g
   b. Mix at $1250 \pm 10$ rpm for $20 \pm 1$ second.
   c. Add toluene diisocyanate (4) volumetrically ($45.0 \pm 0.5$ mL.)
   d. Mix at $1750 \pm 10$ rpm for $6.0 \pm 0.25$ seconds.

Procedure For Determining Foam Height

1. Abstract

A cup containing the prepared foaming formulation was inserted into the bottom of a pail and the foam was allowed to expand into the pail. The height of the completed foam was measured and the results were reported in millimeters.

2. Apparatus

Cup: 1 quart Dixie cup.
Height Gage: Digimatic, Mitutoyo Mfg. Co. Ltd., Tokyo, Japan. 192 Series.
Pail: 3 quart (2.9 liter), available from Lilly Tulip Cup Co., paint insert, unwaxed, type 1OT1.
Oven: Mechanical convection capable of controlling temperature to $\pm 2$ F.
Pail Holder: Ring stand to support the pail in a level position and to allow the cup to hang freely from the bottom of the pail. The ring stand must be heat stable and allow transfer into and out of the oven when supporting the pail/cup assembly.

3. Procedure

Conducted on two samples. Pail was placed in pail holder. The foam ingredients were mixed in the cup as specified in the formulation. Immediately, the cup was placed gently into the pail so that the rim of the cup rested on the bottom of the pail. The material was allowed to foam at $23° \pm 2°$ C. and $50 \pm 4\%$ RH until the foam stopped rising. The sample was left alone for 10 minutes. The holder and cup/pail/foam assembly was placed into the oven at $93° \pm 3°$ C. for $20 \pm 0.5$ minutes. The sample was removed from the oven and immediately measured with the height gage. (It is important that the foam be measured hot as rapidly as possible following removal from the oven since the foam will shrink during cooling.) The foam height was measured to the nearest tenth of a millimeter from the bottom of the cup to the top of the foam. The average height of the two samples was reported.

The invention will be further clarified by a consideration of the following examples. All parts and percentages in the examples are on a weight basis unless otherwise stated.

EXAMPLE I

In this example two hydrosilylation reactions were conducted using IPA and 2,2,4-trimethyl-1,3-pentanediol monoisobutyrate as the solvent in an effort to determine the amount of SiH consumed by the solvent.

A mixture of 42.3 grams of an organohydrogensiloxane having the average formula $Me_3SiO(Me_2SiO)_{1.5}$ $_7(MeHSiO)_{2.1}SiMe_3$ and 100.0 grams of IPA was prepared. A sample was removed and tested for percent SiH. The mixture was heated to 75° C. and a solution of $H_2PtCl_6.H_2O$ in IPA was added in sufficient amount to provide 30 ppm Pt. The heat source was removed and the exothermic hydrosilylation reaction was allowed to proceed until no further temperature increase was noted. Heat was applied to the mixture as needed to keep its temperature at 82° C. for 30 minutes. The mixture was cooled to room temperature and a sample was removed and tested for percent SiH. This procedure was repeated using 2,2,4-trimethyl-1,3-pentanediol monoisobutyrate instead of IPA as the solvent. The temperature, however, was maintained at 120° C. instead of 82° C.

SiH consumption for each solvent system was determined by reacting the samples with a saturated solution of sodium butylate in a closed system. The hydrogen that was released was measured manometrically. The percent SiH consumed was calculated and is listed in Table I.

TABLE I

| Solvent | % SiH Initial | % SiH Final | Consumption |
|---|---|---|---|
| 1. Isopropyl Alcohol | 0.0455 | 0.00795 | 83% |
| 2. 2,2,4 Trimethyl 1,3 pentanediol monoisobutyrate | 0.0500 | 0.03450 | 31% |

The results in Table I clearly indicate that IPA consumed 83% of the available SiH sites on the siloxane backbone, whereas 2,2,4-trimethyl-1,3-pentanediol monoisobutyrate consumed only 31%. This demonstrates that 2,2,4-trimethyl-1,3-pentanediol monoisobutyrate is much less competitive with the vinylated glycol for SiH sites on the siloxane backbone. This data indicates that SiH consumption is a function of the molecular geometry of the solvent. This molecular geometry theory is proposed as a means for explaining the extraordinary results obtained using the solvents of this invention. However, applicant does not wish to be bound by any theory or hypothesis as to the mechanism by which the compositions of this invention actually obtain their unusual, and unexpected results.

EXAMPLE II

This example illustrates the feasibility of making a siloxane oxyalkylene block copolymer surfactant to stabilize flexible polyurethane foam using 2,2,4-trimethyl-1,3-pentanediol monoisobutyrate as the compatibilizer solvent instead of IPA.

A mixture of 165.9 grams of an olefinically substituted polyoxyalkylene having an average formula $CH_2=CHCH_2(OCH_2CH_2)_{18}(OCHCH_3CH_2)_{18}OC(O)CH_3$, 29.9 grams of an olefinically substituted polyoxyalkylene having an average formula $CH_2=CHCH(OCH_2CH_2(_{12}OC(O)CH_3$, 56.5 grams of an organohydrogensiloxane having an average formula $Me_3SiO(Me_2SiO)_{15.7}(MeHSiO)_{21}SiMe_3$ and 147.6 grams of 2,2,4-trimethyl-1,3-pentanediol monoisobutyrate was prepared. The mixture was degassed by vacuum and nitrogen sparge and heated to 75° C. A solution of $H_2PtCL_6.H_2O$ in IPA was added in sufficient amount to provide 11 ppm Pt. The heat source was removed and the exothermic hydrosilylation reaction was allowed to proceed until no further temperature increase was noted. Heat was applied to the mixture as needed to keep its temperature at 95°–115° C. for 30 minutes.

After cooling, the surfactants were evaluated using the Foaming Efficiency Test For Conventional Flexible Foam. The results are listed in Table II.

TABLE II

| Solvent | Foam Height (mm) | Breathability (cfm) |
|---|---|---|
| 1. 2,2,4 Trimethyl 1,3 pentanediol monoisobutyrate | 235.4 | 6.7 |
| 2. Isopropyl alcohol | 232.3 | 6.2 |

The results in Table II indicate that foam height and breathability of flexible polyurethane foam using 2,2,4-trimethyl-1,3-pentanediol monoisobutyrate as the surfactant solvent outperforms IPA as the surfactant solvent.

EXAMPLE III

This example illustrates some of the processing and formulation requirements for conducting the hydrosilylation in 2,2,4-trimethyl-1,3-pentanediol monoisobutyrate.

A mixture of 234.3 grams of an olefinically substituted polyoxyalkylene having an average formula $CH_2=CHCH_2(OCH_2CH_2)_{18}(OCHCH_3CH_2)_{18}OC(O)CH_3$, 65.7 grams of an organohydrogensiloxane having an average formula $Me_3SiO(Me_2SiO)_{103}(MeHSiO)_{10}SiMe_3$ and 25.0 grams of 2,2,4-trimethyl-1,3-pentanediol monoisobutyrate was prepared. The mixture was degassed by vacuum and nitrogen sparge and heated to 75° C. A solution of $H_2PtCL_6.H_2O$ in IPA was added in sufficient amount to provide 11 ppm Pt. The heat source was removed and the exothermic hydrosilylation reaction was allowed to proceed until no further temperature increase was noted. Heat was applied to the mixture as needed to keep its temperature at 95° C. for 30 minutes. This procedure was repeated, the temperature, however, was maintained at 115° C. instead of 95° C. for 30 minutes. The procedure was repeated a third time during which no solvent (2,2,4-trimethyl-1,3-pentanediol monoisobutyrate) was added and the temperature was maintained at 115° C. for 30 minutes.

After cooling, the surfactants were evaluated using the Foaming Efficiency Test For Conventional Flexible Foam. The results are listed in Table III.

TABLE III

| Solvent | Hold Temp. | Amount Tested | Height (mm) | Breathability (cfm) |
|---|---|---|---|---|
| Yes | 95° C. | 0.52 gms. | collapse | could not obtain |
| Yes | 115° C. | 0.52 gms. | 230.7 | 7.45 |
| No | 115° C. | 0.55 gms. | 221.2 | could not obtain |

The results in Table III indicate that a temperature above 95° C. and some compatibilizer solvent are needed to make a surfactant that will adequately stabilize conventional flexible polyurethane foam.

EXAMPLE IV

This example illustrates the feasibility of making a siloxane oxyalkylene block copolymer surfactant used for stabilizing rigid polyurethane foam with 2,2,4-trimethyl-1,3-pentanediol monoisobutyrate as the solvent instead of IPA.

A mixture of 206.4 grams of an olefinically substituted polyoxyalkylene having an average formula $CH_2=CHCH_2(OCH_2CH_2)_{12}OH$, 90.6 grams of an organosiloxane having an average formula $Me_3SiO(Me_2SiO)_9(MeHSiO)_4SiMe_3$, 30.0 grams of 2,2,4-trimethyl-1,3-pentanediol monoisobutyrate, and 0.1 grams of sodium acetate was prepared. The mixture was degassed by vacuum and nitrogen sparge and heated to 75° C. A solution of $H_2PtCL_6.H_2O$ in IPA was added in sufficient amount to provide 13 ppm Pt. The heat source was removed and the exothermic hydrosilylation reaction was allowed to proceed until no further temperature increase was noted. Heat was applied to the mixture as needed to keep its temperature at 120° C. for 30 minutes. This procedure was repeated using IPA as the solvent.

After cooling, the surfactants were evaluated using the Foaming Efficiency Test For Rigid Foam. The results are listed in Table IV.

TABLE IV

| Solvent | Thermal Conductivity (K-Factor) | Density (lbs/ft³) | Foam Height |
|---|---|---|---|
| 1. 2,2,4-trimethyl-1,3-pentanediol monoisobutyrate | 0.117 | 2.41 | 633.6 mm. |
| 2. Isopropyl alcohol | 0.125 | 2.50 | 630.0 mm. |

The results in Table IV indicate that rigid polyurethane foam prepared with 2,2,4-trimethyl-1,3-pentanediol monoisobutyrate is superior in terms of thermal conductivity and density as the foam prepared using IPA as the solvent. It should be noted that a K-factor difference of 0.003 is considered significant by those skilled in the art and in this case the K-factor difference is 0.008 units.

EXAMPLE V

This example illustrates the feasibility of making a siloxane oxyalkylene block copolymer surfactant used for stabilizing highly resilient flexible polyurethane foam with 2,2,4-trimethyl-1,3-pentanediol monoisobutyrate as the solvent instead of polypropylene glycol.

A mixture of 109.5 grams of an olefinically substituted polyoxyalkylene having an average formula $CH_2=CHCH_2(OCHCH_3CH_2)_{2.5}OCH_3$, 115.5 grams of an organosiloxane having an average formula $Me_3SiO(Me_3SiO)(MeHSiO)SiMe_3$, 75.0 grams of 2,2,4-trimethyl-1,3-pentanediol monoisobutyrate, and 0.3 grams sodium acetate was prepared. The mixture was degassed by vacuum and nitrogen sparge and heated to 75° C. A solution of $H_2PtCL_6.H_2O$ in IPA was added in sufficient amount to provide 14 ppm Pt. The heat source was removed and the exothermic hydrosilylation reaction was allowed to proceed until no further temperature increase was noted. Heat was then applied to the mixture as needed to keep its temperature at 120° C. for 60 minutes. This procedure was repeated using polypropylene glycol as the solvent.

After cooling, the surfactants were evaluated using the Foaming Efficiency Test For High Resiliency Flexible Foam. The results are listed in Table V.

TABLE V

| Solvent | Foam Height (mm) |
|---|---|
| 1. 2,2,4-trimethyl-1,3-pentanediol monoisobutyrate | 361.0 |
| 2. Polypropylene glycol | 361.2 |

The results in Table V indicate that the surfactant prepared using 2,2,4-trimethyl-1,3-pentanediol monoisobutyrate as the solvent is comparable to the surfactant prepared using polypropylene glycol as the solvent.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

What is claimed is:

1. A process for the preparation of organosiloxane copolymers, said process comprising the steps of:
   (I) forming a mixture of:
   (A) an organohydrogensiloxane having the average structural formula:

$R_3Si[OSi(CH_3)_2]_a[OSiH(CH_3)]_bOSiR_3$ in which formula
   R is a hydrocarbon radical free of aliphatic unsaturation and contains from 1 to 10 carbon atoms,
   a has an average value from 1 to 192, and
   b has an average value from 1 to 30;
   (B) a polyoxyalkylene selected from the group consisting of:

$R^1(OCH_2CH_2)_z\text{—}OR^2$ (i)

$R^1(OCH_2\underset{|}{\overset{CH_3}{C}}H)_w\text{—}OR^2$ and (ii)

$R^1(OCH_2CH_2)_z(OCH_2\underset{|}{\overset{CH_3}{C}}H)_w\text{—}OR^2$ (iii)

wherein the $(OCH_2CH_2)$ units and the $(OCH_2\underset{|}{\overset{CH_3}{C}}H)$ units may be blocked or random,
   $R^1$ is an alkenyl group,
   $R^2$ is any substituent which does not interfere with the process,
   z has a value of from 1 to 20; and
   w has a value of 1 to 20;
   (C) a monocarboxylate ester of an alkanediol; and
   (II) heating the mixture in an inert atmosphere to a temperature which does not exceed the temperature at which the organohydrogensiloxane reacts with the monocarboxylate ester of an alkanediol;
   (III) adding to said heated mixture, a catalytic amount of a noble metal hydrosilylation catalyst,
   (IV) maintaining the temperature of said mixture below 130° C.; and
   (V) recovering said copolymer.

2. The process of claim 1 wherein the temperature in step (II) is from 85° C. to 130° C.

3. The process of claim 1 wherein the temperature in step (II) is from 95° C. to 115° C.

4. The process of claim 1 wherein the monocarboxylate ester of an alkanediol is 2,2,4-trimethyl-1,3-pentanediol monoisobutyrate.

5. The process of claim 1 wherein the monocarboxylate ester of an alkanediol is present in an amount of from 5 to 50 weight percent based on the total weight of said mixture.

6. The process of claim 5 wherein the monocarboxylate ester of an alkanediol is present in an amount of from 6 to 15 weight percent based on the total weight of said mixture.

7. The process of claim 5 wherein the monocarboxylate ester of an alkanediol is present in an amount of from 15 to 35 weight percent based on the total weight of said mixture.

8. The process of claim 1 wherein the organosiloxane has the average formula $Me_3SiO(Me_2SiO)_{1-192}(MeHSiO)_{1-30}SiMe_3$.

9. The process of claim 1 wherein there is also present one or more polyoxyalkylenes in addition to the polyoxyalkylene of component (B).

10. The process of claim 1 wherein the noble metal hydrosilylation catalyst is platinum.

11. The process of claim 1 wherein the noble metal hydrosilylation catalyst is $H_2PtCl_6 \cdot H_2O$.

* * * * *